United States Patent [19]

Singh et al.

[11] Patent Number: 5,552,173
[45] Date of Patent: Sep. 3, 1996

[54] METHOD FOR DEFATTING MEAT

[75] Inventors: Prem S. Singh, Glenellyn; William A. Trujillo, Oakpark, both of Ill.

[73] Assignee: Swift-Eckrich, Inc., Downers Grove, Ill.

[21] Appl. No.: 434,126

[22] Filed: May 2, 1995

Related U.S. Application Data

[63] Continuation of Ser. No. 201,114, Feb. 23, 1994, abandoned.

[51] Int. Cl.$^6$ .............................. A23L 1/31; A23L 1/317
[52] U.S. Cl. ................................ 426/417; 426/478
[58] Field of Search ..................... 426/417, 478, 426/646; 554/8, 23, 175; 494/27, 29

[56] References Cited

U.S. PATENT DOCUMENTS

| | | |
|---|---|---|
| 1,497,179 | 6/1924 | Matsuoka . |
| 1,766,033 | 6/1930 | Meakin . |

(List continued on next page.)

FOREIGN PATENT DOCUMENTS

| | | |
|---|---|---|
| 239650 | 7/1962 | Australia . |
| 405953 | 9/1970 | Australia . |
| 417271 | 9/1971 | Australia . |
| 1923570 | 3/1972 | Australia . |
| 557681 | 5/1958 | Canada . |
| 983516 | 2/1976 | Canada . |
| 048771A1 | 9/1980 | European Pat. Off. . |
| 0342972A2 | 11/1989 | European Pat. Off. . |
| 2647642 | 12/1990 | France . |
| 1053118 | 3/1959 | Germany . |
| 1492890 | 8/1970 | Germany . |
| 2802271 | 8/1978 | Germany . |
| 2816521A1 | 10/1979 | Germany . |
| 4104482A1 | 8/1992 | Germany . |
| 46-31880 | 9/1971 | Japan . |
| 1-171461 | 7/1989 | Japan . |
| 1-171462 | 7/1989 | Japan . |
| 2-113871 | 4/1990 | Japan . |
| 112018 | 8/1962 | Pakistan . |
| 178433 | 1/1966 | U.S.S.R. . |
| 541856 | 1/1977 | U.S.S.R. . |
| 625314 | 6/1949 | United Kingdom . |
| 748814 | 5/1956 | United Kingdom . |
| 804145 | 11/1958 | United Kingdom . |
| 917638 | 2/1963 | United Kingdom . |
| 948651 | 2/1964 | United Kingdom . |
| 1046642 | 10/1966 | United Kingdom . |
| 260684A | 10/1991 | United Kingdom . |
| 2244999A | 12/1991 | United Kingdom . |
| 264220A | 1/1993 | United Kingdom . |
| 974154 | 1/9163 | United Kingdom . |
| WO8503415 | 2/1985 | WIPO . |
| WO8700733 | 2/1987 | WIPO . |
| WO9000863 | 2/1990 | WIPO . |
| WO91/08680 | 6/1991 | WIPO . |
| WO93/00829 | 1/1993 | WIPO . |

OTHER PUBLICATIONS

Bailey, J. W. DVM, *Enclycopedia of Labeling Meat and Poultry Products*, 1970.

Berry, B. W., and N. A. James, *Present and Future Status of Low–Fat Ground Beef Production in the United States*, 83rd Annual Meeting of Amer. Society of Animal Science North-Eastern Section, Jul. 21–23, 1991.

(List continued on next page.)

*Primary Examiner*—Arthur L. Corbin
*Attorney, Agent, or Firm*—Pretty, Schroeder, Brueggemann & Clark

[57] ABSTRACT

In accordance with the present invention, there are provided methods for defatting meat, comprising adjusting the temperature of raw meat material up to its corresponding species body temperature in the substantial absence of added reagents, and feeding said temperature adjusted raw material to a decanter centrifuge maintained under suitable conditions to form a meat layer, an intermediate boundary layer containing particles of fat tissue, meat and moisture, and a fat layer within the centrifuge. Liquid is metered into the temperature adjusted raw material entering the centrifuge in an amount sufficient to separate the meat layer form the other layers. Subsequently, a defatted meat is recovered.

18 Claims, 1 Drawing Sheet

U.S. PATENT DOCUMENTS

| | | | |
|---|---|---|---|
| 1,930,091 | 10/1933 | Halvorson et al. | |
| 2,193,871 | 3/1940 | Hanno. | |
| 2,209,554 | 7/1940 | Bath | 494/27 X |
| 2,388,284 | 11/1945 | Ratner. | |
| 2,467,529 | 1/1949 | Hormel et al. | |
| 2,497,367 | 2/1950 | Notevarp. | |
| 2,503,312 | 1/1951 | Worsham et al. | |
| 2,551,042 | 5/1951 | Nyrop. | |
| 2,616,910 | 11/1952 | Pavia. | |
| 2,673,790 | 3/1954 | Illsley. | |
| 2,679,974 | 6/1954 | Gooch. | |
| 2,697,112 | 12/1954 | Kramer. | |
| 2,697,113 | 12/1954 | Kramer. | |
| 2,703,676 | 3/1955 | Gooch. | |
| 2,742,488 | 4/1956 | Dufault. | |
| 2,745,856 | 6/1956 | Dayen et al. | |
| 2,820,709 | 1/1958 | Schack et al. | |
| 2,820,804 | 1/1958 | Gordon, Jr. | |
| 2,823,214 | 2/1958 | Sharples. | |
| 2,823,215 | 2/1958 | Downing. | |
| 2,832,634 | 4/1958 | Bergerson. | |
| 2,875,222 | 2/1959 | Dormitzer. | |
| 2,877,122 | 3/1959 | Greenfield. | |
| 2,984,622 | 5/1961 | Brunninghaus. | |
| 3,008,831 | 11/1961 | Christianson. | |
| 3,013,887 | 12/1961 | Eolkin. | |
| 3,020,160 | 2/1962 | Downing. | |
| 3,044,623 | 7/1962 | Christianson. | |
| 3,050,399 | 8/1962 | Kielsmeier et al. | |
| 3,063,840 | 11/1962 | Sullivan. | |
| 3,078,165 | 2/1963 | Alberts. | |
| 3,078,287 | 2/1963 | Downing. | |
| 3,114,638 | 12/1963 | Huhn et al. | |
| 3,141,774 | 7/1964 | Little. | |
| 3,142,570 | 7/1964 | Thompson. | |
| 3,158,634 | 11/1964 | Marsh. | |
| 3,177,080 | 4/1965 | Alberts. | |
| 3,228,594 | 1/1966 | Amero. | |
| 3,261,546 | 7/1966 | Gruver, Jr. | |
| 3,270,041 | 8/1966 | Artar et al. | |
| 3,282,972 | 11/1966 | Merlis. | |
| 3,346,393 | 10/1967 | Bradford. | |
| 3,352,841 | 11/1967 | Lyon. | |
| 3,449,315 | 6/1969 | Aikins. | |
| 3,493,399 | 2/1970 | Levin. | |
| 3,565,634 | 2/1971 | Osterman. | |
| 3,586,515 | 6/1971 | Anderson. | |
| 3,649,301 | 3/1972 | Stump et al. | |
| 3,748,148 | 7/1973 | Jehle. | |
| 3,764,713 | 10/1973 | Poplack et al. | 426/233 |
| 3,780,191 | 12/1973 | Langer | 426/231 |
| 3,796,737 | 3/1974 | Holboll. | |
| 3,804,958 | 4/1974 | Adams. | |
| 3,804,964 | 4/1974 | Hogstedt et al. | |
| 3,881,032 | 4/1975 | Matsumoto et al. | 426/643 |
| 3,904,770 | 9/1975 | Hale et al. | 426/645 |
| 3,922,377 | 11/1975 | Whittle | 426/645 |
| 3,959,518 | 5/1976 | Vincent. | |
| 4,058,633 | 11/1977 | Staff et al. | 426/315 |
| 4,098,095 | 7/1978 | Roth. | |
| 4,137,335 | 1/1979 | Holm et al. | 426/417 |
| 4,163,009 | 7/1979 | Filstrup. | |
| 4,163,804 | 8/1979 | Meyer et al. | |
| 4,168,418 | 9/1979 | Bird. | |
| 4,201,302 | 5/1980 | Roth | 209/597 |
| 4,216,239 | 8/1988 | Gloppestad | 426/456 |
| 4,294,860 | 10/1981 | Roth | 426/417 |
| 4,299,352 | 11/1981 | Erickson | 494/27 |
| 4,335,146 | 6/1982 | Bladh | 426/231 |
| 4,344,976 | 8/1982 | Bladh | 426/472 |
| 4,361,590 | 11/1982 | Wojcik | 426/480 |
| 4,504,515 | 3/1985 | Hohenester et al. | 426/641 |
| 4,565,709 | 1/1986 | Berge et al. | 426/641 |
| 4,567,050 | 1/1986 | Roth | 426/417 |
| 4,619,789 | 10/1986 | Strop et al. | |
| 4,680,183 | 7/1987 | Van Schouwenburg | 426/272 |
| 4,735,819 | 4/1988 | Johnson et al. | 426/646 |
| 4,778,682 | 10/1988 | Chapman | 426/248 |
| 4,844,922 | 7/1989 | Uemera et al. | 426/104 |
| 4,847,099 | 7/1989 | Elinsky | 426/233 |
| 4,876,103 | 10/1989 | Kawano et al. | 426/574 |
| 4,904,496 | 2/1990 | Izzo et al. | 426/646 |
| 4,917,912 | 4/1990 | Duncan | 426/291 |
| 4,948,607 | 8/1990 | Margolis | 426/281 |
| 4,980,185 | 12/1990 | Small | 426/417 |
| 5,011,703 | 4/1991 | Chapman | 426/646 |
| 5,026,565 | 6/1991 | McLachlan et al. | 426/241 |
| 5,041,055 | 8/1991 | Roth. | |
| 5,061,505 | 10/1991 | Culley et al. | 426/601 |
| 5,082,678 | 1/1992 | Margolis | 426/211 |
| 5,116,633 | 5/1992 | Small | 426/641 |
| 5,128,127 | 7/1992 | Beck | 424/88 |
| 5,147,672 | 9/1992 | McLachlan et al. | 426/241 |
| 5,164,213 | 11/1992 | Bonkowski | 426/281 |
| 5,167,977 | 12/1992 | Gamay | 426/417 |
| 5,168,800 | 12/1992 | Margolis | 99/495 |
| 5,215,772 | 6/1993 | Roth | 426/231 |
| 5,221,554 | 6/1993 | Gamay | 426/646 |
| 5,262,185 | 11/1993 | Babka et al. | 426/291 |
| 5,382,444 | 1/1995 | Roehrig et al. | 426/646 |

OTHER PUBLICATIONS

Cannell, Laura E.; J. W. Savell, S. B. Smith R. Cross and L. C. St. John; *Fatty Acid Composition and Caloric Value of Ground Beef Containing Low Levels of Fat*, Journal of Food Science, 1989.

Dawson, P. L., B. W. Sheldon, and H. R. Ball, Jr., *Extraction of Lipid and Pigment Components from Mechanically Deboned Chicken Meat*, Journal of Food Science, 1988.

Dawson, P. L., B. W. Sheldon, and H. R. Ball, Jr., *Pilot--Plant Washing Procedure to Remove Fat and Color Components from Mechanically Debone Chicken Meat*, Poultry Science, Jun. 1989.

Dayen, W. R., K. M. Christensen and R. E. Morse, *Low Temeprature, High Speed Rendering—The Kingan Process*, Food Technology, Nov. 1953.

Downing, Frank P., Sharples Corporation, *the Production of Meat and Fat Products Through Centrifugal Rendering*, The Journal of the American Oil Chemists'Society, Aug. 1959.

Giese, James, *Developing Low–Fat Meat Products—A variety of techniques toi reduce or replace fat are being used to make meat products more marketable*, Food Technology, Apr. 1992.

Keeton, J. T., *Low–Fat Meat Products—Technological Problems with Processing*, Meat Science 36 (1994) 261–276.

King Jerry W., James H. Johnson and John P. Friedrich, *Extraction of Fat Tissue from Meat Products with Supercritical Carbon Dioxide*, J. Agric. Food Chem. 1989.

McCurdy, Sandra M., Pavel Jelen, Paul Fedec, and Darrell F. Wood, *Laboratory and Pilot Scale Recovery of Protein from Mechanically Seperated Chicken Residue*, Journal of Food Science, 1986.

Prokop, William H., *Rendering Systems for Processing Animal by–Product Materials*, Symposium, May 8–12, 1983.

Price, J. F. and B. S. Schweigert (Editors), *The Science of Meat and Meat Products,* American Meat Institute Foundation, 1971.

Sullivan, Frank E., *Continuous Low-Temperature Rendering Process,* The Journal of the American Oil Chemists'Soceity, Feb, 1959.

Vibrans, Frank C., *Rendering,* The Journal of the American Oil Chemists' Society, Oct. 1949.

Unknown, *Development of Low-Fat Beef Patties With Added Dietary Fibers,* Prepared by Webb Technical Group, Inc., Nov. 20, 1990.

Unknown, *New Australian technology creates—Low-Fat Meat,* Food Engineering, Sep. 1988.

Unknown, The Centrifuge: tool with a thousand uses, [Based on information provided by Alfa–Laval, Inc., Food Engineering, May 1983.

Unknown, *New technology yields low-fat meat ingredients,* Food Engineering, Feb. 1992.

R. A. Lawrence, P. Jelen, *Pilot Plant Extraction of Protein from Mechanically Seperated Poultry Residues,* Can. Inst. of Food Science and Technology, vol. 15, No. 4, 1982.

N. G. Marriot, S. K. Phelps, C. A. Costello and P. P. Graham, *Restructed Beef with Fat Variations,* Journal of Food Quality 11 (1988).

G. W. Froning and Faye Johnson, *Improving the Quality of Mechanically Deboned Fowl Meat by Centrifugation,* Dept. of Poultry Science, University of Nebreska, Journal of Food Science, vol. 38 (1973).

Advertisement, *Turn DAF Skimmings Problems into Profits,* Alfa–Laval, Meat & Poultry, Jan. 1992.

Armonioso, U. *La Moderna Tecnica della Lavorazione dei Grassi Animali e Vegetali,* Alfa Laval S.p.A., Milano, La Revista Italiana Delle sostanze Grasse, vol. XIVIII, Sep. 1971.

Article, *Single-pass Centrifuge Produces Three Different Chicken By-products,* Field Report, Food Engineering Int'l., Jul. 1978.

Claus, James R., *Fat Reduction in Comminuted Meat Systems, Processed Meats, Reciprocal Meat Conference proceedings,* vol. 44, 1991.

Dhillon, A. S. and A. J. Maurer, *Utilization of mechanically deboned Chicken Meat in the Formulation of Summer Sausages,* Poultry Science 54: 1164–1174, 1975.

Gabrowski, P., *Einfluss des Synthetischen Lysins auf die Qualitat des Schweinefleisches Zur Herstellung von Konserven und Halbkonserven,* Technologsches Forschugsinstitut fur Fleischwirtschaft, Sofia Bulgarien.

Hermann, Dr. Ing. H., Dipl–Ing. W. Nitzsche, *Maschinelle Trnnung von Fleisch Und Knochen,* Fleisch 29 (1975, H.8).

Kijowski, Jacek, *Attempts at Obtaining the Wet Concertrate of Myofibrils From Chicken Breast and Mechanically Deboned Poultry and Its Functional Properties,* Acta Alimentaria Plonica, vol. XV (XXXIX) No. 4).

Kumar, Sushil and J. Wismer Pedersen, *Methods of Improving Mechanically Deboned Poultry Meat Quality—A Review,* Avian Research, 1983, 67(3): 108–115.

Lawrence, R. A. and Jelen, P., *Alkaline Extraction of Protein From Residues of Mechanical Separation of Poultry,* Research in Food Science and Nutrition vol. 2, Basic Studies in Food Science, Proceedings of the Sixth International Congress of Food Science and Technology Duboin, Sep. 18–23, 1983.

Maurer, A. J. and J. W. Goble, *Partial Dewatering of Mechanically Debvoned Poultry Meat,* 1981 Poultrey Science 60:750–760.

Mccurdy, Sandra M., Pavel Jelen and Darrell F. Wood, *Protein Recovery from Mechanically Seperated Pork Residue,* Con. Inst. Food Sci. Technol., J. vol. 20, No. 1, pp. 53–55 1987.

Marsden, James L., *Update: Scientific/Technical Issues,* Reciprocal meat Conference Proceedings, vol. 43, 1990.

Marsden, James L., *Red Meat Recovery System by Physical Separation,* American Meat Science Association, Proceedings 46th Annual Reciprocal Meat Conference, Jun. 20–23, 1993.

McCutcheon, John and Daniel L. Engeljohn, *Products from Lean Recovery,* American Meat Science Association, Proceedings 46th Annual Reciprocal Meat Conference, Jun. 20–23, 1993.

Pearson, A. M., A. Asghar, J. I. Gray, A. M. Booren, *Impact of Fat Reduction on Palatability and Cosumer Acceptance of Processed Meat,* American Meat Science Association, Proceedings 46th Annual Reciprocal Meat Conference, Jun. 20–23, 1993.

Richardson, R. I. and J. M. Jones, *The Effects of Salt Concentration and pH upon Water-Binding, Water-Hiding and Protein Extractability of Turkey Meat,* International Journal of Food Science and Technology (1987) 22, 683–692.

Scientist, G. S. Paddy, *Mechanical Deboning—A Way to Full Utilization of Poultry Meat,* Poultry Guide, Jul. 1983, 92–95.

Schmidhofer, Th., *Zur Beurteilung von Speck Hinsichtlich Seiner Eignnung fur die Fleischwarenherstellung,* and translation: *With Regard to the Evaluation of Bacon Fat Related to Its Suitability for the Meat Industry,* Proc. Eur Meeting of Meat Research Worker, 15:pp. 405–408, 1969.

Shand, Phyllis J., Glen R. Schmidt, Roger W. Mandigo, and James R. Clause, *New Technology for Low–Fat Meat Products,* Reciprocal Meat Conference Proceedings, vol. 43, 1990., 37–52.

Swan, J. E., *Low Temperature Rendering of Animal Materials and Its Application to Reducing Fat in Edible Meat,* American Oil Chemists'Society Proceedings World Conference on Emerging Technologies in the Fats and Oils Industry, Meat Industry Research Institute of New Zealand, Hamilton, New Zealand, Sep. 30, 80, 373–376.

Swan, J. E. and L. Catcheside, *Defatting Mutton by Low Temperature Thermal Processing,* Meat Industry Research Institute of New Zealand Inc., Apr. 1984, *Altering Fat Composition of Red Meat and Fish Products,* Food Fats and Health.

*Altering Fat Compostion of Red Meat and Fish Products,* Food Fats and Health.

Willimsen, Bernardus J. J., *Seperation of Residual Meat Attached to Bones,* Reciprocal Meat Conference Proceedings, vol. 46, 1993, 39–43.

Russian article, CFE–4 Tipusu Titan Zsirolvaszto–vonal Muszaki Tovabbfejlesztese, Husipar, pp. 117–125.

Russian article, Myasnaya Industriya SSSR, No. 5:27–29, 19975, pp. 27–29.

ated 25, 1994, now abandoned.

METHOD FOR DEFATTING MEAT

This application is a continuation of application Ser. No. 08/201,114, filed Feb. 23, 1994, now abandoned.

The present invention relates to processes for defatting meat, defatted meat compositions, and products containing such defatted meat compositions.

BACKGROUND OF THE INVENTION

In recent years, a great deal of attention has been focused on the relationship between total dietary fat, saturated fat, and cholesterol intake, especially as these relate to the incidence of diseases of the blood vessels, such as coronary heart disease and arteriosclerosis. As a consequence of these studies and concerns, medical professionals have been advising that human consumption of animal fat be reduced. This suggestion has resulted in a decline of meat consumption, particularly of red meat, which is known to contain high levels of saturated fat and cholesterol. This decline of meat consumption has adversely affected the meat industry, resulting in economic loss.

Several processes have been developed to treat meats from various animal sources to reduce their fat content. These processes typically have employed one or more of the following three approaches. First, the removal of some fat from meat has been accomplished by mechanical means such as a crusher, a press or a cutting tool. Second, treatments including heat, light, and reaction of gases with meats including fluid extraction. Thrd, treatment with strong chemical reagents, such as acids, and the like.

However, acid or alkaline pH treatments of meats facilitates the binding of anions or cations, respectively, to the proteins, thereby adversely affecting the functional properties of proteins, particularly the solubility characteristics. In addition, when diluents, such as water, are used with microcomminution of meat and high temperature, the functional properties of the resulting meat are adversely affected.

In addition, the total fat and saturated fat levels in such meats produced by these prior art methods are still quite high with respect to the currently recommended healthy diet (the Surgeon General's recommendation is no more than 30% of calories from fat). Individuals with restricted dietary requirements, as well as health-conscious consumers, can obtain only modest reductions of total fat and cholesterol intake by consuming the reduced fat products currently on the market.

Despite these developments, the currently known procedures collectively remain ineffective for the purpose of substantially reducing total fat and cholesterol of meats, fowl, and sea foods. All of the currently available procedures typically involve the grinding or crushing of meat followed by chemical and physical extraction with steam, heat, pressure, fluids, or some combination of these treatments. One of the primary challenges in defatting meat is the removal of appreciable quantities of total fats located in inaccessible components of the meat. Most fat exists in the adipose tissues wherein the fat is embedded in connective tissues. In addition, intramuscular fat represents a good portion of marbling and is the most difficult to eliminate.

Up until now, neither cholesterol, fat nor saturated fat could be effeciently extracted from edible meats and meat products by simply employing heat and water. While water and steam has previously been employed to melt some fats, which can then be physically removed in part, these treatments cannot substantially extract the cholesterol or fat and saturated fats of meat.

Typically, only expensive lean meats can be utilized for the preparation of such products, which in turn make such products cost prohibitive for most consumers, further limiting the consumption potential. The need for a simplified commercial process for defatting meat, thereby adding value to high fat meats and low value fish is desired.

OBJECTS OF THE INVENTION

It is therefore an object of the invention to provide a simplified method for producing a low-fat meat product.

It is another object of the invention to produce a defatted meat composition with the protein profile, vitamin profile, and fat composition profile substantially unchanged relative to the respective non-defatted raw starting material.

It is yet another object of the invention to provide a method for defatting meat that does not substantially denature proteins contained in the defatted meat.

It is a further object of the invention to provide a method for defatting meat that does not require chemical additives, catalysts, acids/bases, or pH adjustment.

It is yet a further object of the invention to provide an inexpensive defatted meat composition that can be substituted for substantially more expensive conventional low fat meats when preparing meat-based food products.

It is still another object of the invention to produce a defatted meat composition with higher yields than currently possible using a minimum number of process steps.

These and other objects of the invention will become apparent to those of skill in the art upon review of the specification and appended claims.

BRIEF DESCRIPTION OF THE INVENTION

In accordance with the present invention, a process is provided for defatting meat. Employing the invention method, the moisture content of the residual defatted meat composition remains substantially the same as the natural moisture content of the respective deboned uncomminuted raw meat starting material. In other words, there is substantially no dilution, with respect to water, of the residual meat composition. In addition, the invention method improves the color of the defatted meat so that the defatted meat composition substantially resembles the color of fresh meat.

In accordance with another embodiment of the present invention, there is provided a defatted meat composition characterized by:

having a protein profile substantially equivalent to the protein profile of the respective deboned raw meat starting material;

having a vitamin profile substantially equivalent to the vitamin profile of the respective deboned raw meat starting material;

having a proportional fat composition substantially equivalent to the fat composition of the respective deboned raw meat starting material;

being substantially free of denatured protein;

having improved functional properties compared to the functional properties of the respective raw meat starting material; and having substantially equivalent water holding capacity relative to the water holding capacity of the respective deboned raw meat starting material. The invention defatted meat composition is useful for preparing low-fat food products.

In accordance with yet another embodiment of the present invention, there are provided food products comprising the invention defatted meat compositions described herein.

DETAILED DESCRIPTION OF THE INVENTION

In accordance with the present invention, there is provided a method for defatting meat comprising:

continuously pumping, in the substantial absence of added reagents, deboned raw meat material at a constant rate through a scraped surface heat exchanger to adjust the temperature of said raw material up to the live body temperature of the corresponding species, and continuously feeding said temperature adjusted raw material to a decanter centrifuge maintained under suitable conditions to form:

a meat layer, an intermediate boundary layer containing particles of fat tissue, meat and moisture, and a fat layer within the centrifuge.

In one aspect of this embodiment, the centrifuge is maintained under sufficient hydrostatic pressure so as to continuously drive both the boundary and fat layers from the centrifuge, thereby leaving a residual meat layer. The meat layer can then be isolated from the centrifuge by well-known methods.

Raw meat suitable for use as the starting material is typically meat that has been mechanically deboned according to methods well known in the art. The raw meat does not have to be comminuted as is required by many prior art methods. In accordance with the present invention, it is contemplated that raw meat from any animal source can be used as the initial material to be processed. The raw meat material may come from mammals, reptiles, fish and birds. For example, meats contemplated for use herein include turkey, such as mechanically deboned turkey (MDT) and mechanically deboned turkey meat (MDTM), chicken, duck, goose, and any kind of domestic or wild fowl; beef, veal, and all meat products from cattle; lamb, mutton, and all meat products from sheep; pork, ham, and all meat products from pigs and swine; and the like. It is not required that the raw meat be only of one kind or obtained from only one source; to the contrary, many recipes and human needs require mixtures of different kinds of meat from various sources. Accordingly, neither the nature, source, type, nor quality of meat is deemed to be a relevant or restrictive factor for purposes of practicing the present invention.

Raw meat employed in the practice of the present invention need not be fresh meat as such; the techniques of freezing, cold storage, and other conventional means for preserving meat without cooking are all deemed to provide meat in a form which is useful for treatment by the present invention.

It is most desirable that the meat to be treated be in a fragmented form rather than in bulk or chunk form. The meat can be prepared in ground or minced form. For example, the meat can be employed after chopping, shredding, piercing, crushing, or in any other form which provides fragmented meat particles of varying sizes. However, it is preferable that the meat not be completely pulverized. For purposes of the present invention, the actual size of the meat particle and the manner in which the meat has been fragmented is not critical. Target sizes for fragmented meat particles are preferably in the range of about 0.5–5 mm. So long as the meat is in some fragmented state whereby the cells are sufficiently ruptured, but not emulsified, so that intracellular lipids become relatively more accessible, the raw meat material is deemed suitable for use within the methods of the present invention. The desired degree of fragmentation will be different for meat obtained from different species.

The raw meat starting material is typically collected in a production size batch and mixed to form one homogeneous mass. This allows a consistent temperature and uniform fat content to be achieved before raw meat starting material is subjected to the invention defatting process. For example, a typical fat content for MDT (mechanically deboned turkey) used as a raw meat starting material is about 20–22% at about 55°–60° F.

A suitable heat exchanger device for use herein is a scraped surface heat exchanger well-known in the art, such as commercially available equipment from Alfa Laval, Cherry Barrel, or APV Company.

Suitable decanter centrifuges for use herein are well-known in the art. Those of skill in the art can select an appropriate decanter centrifuge that will operate substantially as described herein with reference to FIG. 1. When hydrostatic pressure is employed in the invention method, the presently preferred decanter centrifuge is the Alfa Laval, Model #NX 309B-31, AVNX 309B-31G (Alfa Laval, Denmark). When hydrostatic pressure is not employed, the presently preferred decanter centrifuge employed is the Alfa Laval, Model# BTNX 3500 (Alfa Laval, Denmark).

As used herein, the phrase "live body temperature of the corresponding animal species" refers to the average body temperature of the live animal from which the raw meat starting material was obtained. This temperature will typically fall within the range of 90°–110° F. For example, when turkey meat is being processed, the meat is preferably adjusted to a temperature in the range of 97°–100° F. When beef is being processed, the meat is preferably adjusted to a temperature in the range of 97°–100° F. It is important not to heat the subject raw meat up to temperatures exceeding 110° F., which will result in the denaturing of the meat proteins and alter the protein profile of the final defatted meat composition.

An advantage provided by the invention method is that substantially no chemical reagents, catalysts, acids, pH adjustments, or any other physical or chemical parameters affecting the functional properties of the defatted meat composition are employed. In addition, no addition of water is employed prior to delivering the raw meat to the decanter centrifuge. The phrase "in the substantial absence of added reagents," refers to the lack of any significant conditioning of the raw meat starting material by addition of chemical reagents, catalysts, water, acids, pH adjustment, diluents, extraction fluids, or the like. Indeed, it is presently preferred that raw meat starting material be subjected to no conditioning by addition of chemical reagents, catalysts, water, acids, pH adjustment, diluents, extraction fluids, or the like, prior to delivering the raw meat into the decanter centrifuge.

The phrase "continuously feeding said temperature adjusted raw material to a decanter centrifuge" refers to the well-known process of automatically delivering raw meat to a centrifuge in a continuous system.

The phrase "maintained under suitable conditions to form a meat layer, an intermediate boundary layer containing particles of fat tissue, meat and moisture, and and a fat layer within the centrifuge," refers to the conditions maintained within the centrifuge such that the desired separation is achieved (e.g., centrifugal force applied and/or hydrostatic pressure). For example, suitable g-forces contemplated for use in the invention methods are in the range of about 2,000–20,000, preferably in the range of 2,500–10,000. A g-force of 3,000–5,000 is especially preferred. When hydrostatic pressure is not employed to separate the boundary layer from the meat layer, and g-forces of at least about 7,000 are employed, an exceptionally low moisture product (dry) is produced having about 50% or less water content. The dry defatted meat composition has a powder-like consistency in bulk form.

Fats in meat are typically distributed essentially either in muscle tissues or in adipose tissue. The composition, physical and chemical properties of the fats found in these two meat tissues are quite different. For example, fats in muscle (lean) tissue contain more phospholipids than does fat in adipose tissues. Phospholipids and the fatty acids of phospholipids which are contained in muscle tissues have a higher degree of unsaturation.

In contrast, lipids in adipose tissues are primarily triacylglycerols and free fatty acids. The adipose tissue-derived fat can be extracted at body temperature or slightly higher if the adipose tissue cells are sufficiently ruptured (e.g., by mechanical deboning, grinding, chopping, and the like) and then subjected to appropriate conditions of centrifugal force.

In addition, meat-derived fats have different relative densities and occur in different sizes relative to adipose tissue-derived fats. A general sedimentation rate under a force of gravitation can be described by Stoke's Law of physics as $$v = \frac{2\gamma^2 g \Delta \rho}{9\mu}$$

where v=velocity of particles $\gamma$=radius of particles g=gravitational force ($\Delta\rho$)=difference in density between solid and liquid $\mu$=viscosity of continuous phase.

It is apparent from this equation that particles having densities different from each other will have different settling characteristics.

In a preferred embodiment, the centrifuge is also maintained under sufficient hydrostatic pressure so as to continuously drive both the boundary and fat layers from the centrifuge, thereby leaving behind a residual meat layer. A sufficient hydrostatic pressure to accomplish this separation can be achieved by injecting water pressure through the feed tube of the centrifuge bowl. The water is introduced into the feed tube as close to the discharge point of feed tube as possible, so as to minimize the amount of time that the water is in contact with the incoming raw material. The amount of water introduced into the centrifuge can range from 0.05 up to about 0.5, preferably 0.2, gallons/10 lbs. incoming raw material. The use of water in the invention process occurs only after the raw meat has been introduced into the feed tube of the centrifuge. This is particularly advantagous in that the water does not come into contact with the raw meat for a length of time such that the protein content of the resulting defatted meat composition is significantly altered relative to the respective untreated raw meat.

Because the centrifugal sedimentation is controlled according to Stoke's law, the water injected into the feed tube of the centrifuge can be metered such that the particle sizes remaining in the solid meat layer can be controlled. In the presence of water, centrifugal sedimentation can be expressed mathematically by the Stoke's law equation $$Dpc = \sqrt{\frac{9Q\mu S}{(P_p - P)VW^2\gamma}}$$

where,

Dpc=critical diameter or cut point. Any particle greater than critical diameter will go to solid meat phase, any particle less than critical diameter will go to liquid phase or fat phase. Particles equal to critical point can go in either phase.

Q=Given flow rate of incoming raw material $\mu$=Liquid viscosity

S=Liquid thickness in bowl of decanter $P_p$=Density of solid

P=Density of liquid

V=Volume of liquid held in the bowl of decanter

W=Rate of rotation (radian/sec)

$\gamma$=Radial distance from center

While maintaining each variable at an optimized constant, the density of liquid can be varied by metering water into the feed tube of decanter. Since fat is lighter than water, this water/fat mixture increases the density of liquid compared with fat, thereby decreasing the denominator of the above formula, which increases the value of Dpc. In other words, the critical diameter is increased by hydrostatic pressure which is created by metering water into the decanter centrifuge. As a result, larger lean meat particles separate into the meat phase and the smaller fat and fat tissues separate into the liquid phase. The overall physical effect of metering the water in the decanter centrifuge is that a defatted meat composition of desired physical characteristics remains in the solid phase of the decanter centrifuge, leaving the fat, fatty tissues (i.e., adipose cell fragments), moisture and some meat particles in the liquid phase, which is subsequently removed.

Those of skill in the art will recognize that inert substances, other than water, that will not mix or react with the meat layer in the centrifuge can be substituted for water to create sufficient pressure to separate the fat and intermediate layers from the meat layer. Exemplary inert substances are described, for example, in U.S. Pat. No. 3,780,191, and include: nitrogen, carbon dioxide, and the like.

In another aspect of the present invention, a high centrifugal force (e.g., 10,000 g) centrifuge (Alfa-Laval BTNX 3500, Denmark) is employed for practicing the present invention in the absence of water. The submerged conveyor body of this centrifuge reduces the bowl pond, ensuring that all particles are subjected to uniform high G force. Additionally, in this system, the unusually large beach length within the centrifuge significantly improves the separation of the boundary layer from the meat layer. In this aspect of the invention the fat content of the defatted meat composition can be reduced to substantially zero percent fat (i.e., below analytical limits) to form a fat-free meat composition.

In accordance with another embodiment of the present invention, there is provided a defatted meat composition. The invention defatted meat composition can be produced by the method described above. The defatted meat composition is characterized by:

having a protein profile substantially equivalent to the protein profile of the respective deboned raw meat starting material;

having a vitamin profile substantially equivalent to the vitamin profile of the respective deboned raw meat starting material;

having a proportional fat composition substantially equivalent to the fat composition of the respective deboned raw meat starting material;

being substantially free of denatured protein;

having substantially improved functional properties compared to the functional properties of the respective raw meat starting material; and having substantially equivalent water holding capacity relative to the water holding capacity of the respective deboned raw meat starting material.

Invention defatted meat compositions contain from 0% up to about 10% fat content, preferably 0% up to about 5% fat content, with less than about 2% fat content being especially preferred. The invention defatted meat composition has a desirable coarse texture and has the appearance of fresh meat.

As used herein, "protein profile" refers to the relative composition of amino acids that are contained in the various proteins within the meat (see, e.g., Example 6 and Table 2).

As used herein, "vitamin profile" refers to the relative composition of vitamins that are contained in the within the defatted meat composition (see, e.g., Example 8 and Table 4).

As used herein, the phrase "proportional fat composition" refers to the relative composition of fat that is contained with the meat. For example, meat fat typically comprises saturated, mono-unsaturated and poly-unsaturated fat. The invention method leaves the proportion of saturated, mono-unsaturated and unsaturated fat substantially unchanged relative to the respective levels in deboned uncomminuted raw meat material.

As used herein, "substantially free of denatured protein" refers to meat isolated by the method described herein. Such meat does not contain a significant amount of denatured protein that typically occurs when deboned animal meat is subjected to temperatures above 110° F. In other words, the proteins in the meat composition produced herein have substantially the same tertiary structures as the proteins in the respective deboned raw meat starting material.

The improved functional properties of the defatted meat composition include, for example, lower fat and cholesterol content, improved binding characteristics, improved flavor and texture, increased fiber content. The improved functional properties are useful in the formulation and further processing of meat products. In addition, it has ben found that the invention defatted meat composition has substantially equivalent water holding capacity relative to the water holding capacity of the respective deboned raw meat starting material. For example, 1 gram of the defatted turkey composition prepared as described in Example 1 holds 0.9 grams of water.

The droplets of fat and particles of meat contained in the defatted meat composition may be microscopically examined employing polarized light microscopy using a combination of plane polarized light and crossed polars. Visualization in this manner indicates that the defatted meat composition has undergone a significant increase in muscle fiber and concurrent reduction in fat droplets and fat particles.

Invention defatted meat compositions can be used in any composition that requires a low fat, low cholesterol, high quality protein source. For example, the invention defatted meat composition can be used in a variety of food products, such as processed meat, poultry, or fish products (e.g., hot dogs, dry or semi-dry sausages, health foods, snack foods (e.g., baked high protein-type snack products), protein drinks, and the like.

Invention defatted meat compositions, when formulated and further processed into finished meat products, suffers no more processing losses in cook shrink and slicing yield than products made from leaner (untreated) raw materials having the same fat content as the defatted materials of the invention. In addition, invention defatted meat compositions, when formulated and further processed into finished meat products, have a substantially similar myoglobin profile compared to meat products from raw meat materials of the same species which has not been defatted. Also, invention defatted meat compositions, when formulated and further processed into finished meat products, result in meat-based products with substantially similar sensory profile and organoleptic properties compared to meat products made with conventional low fat high cost raw materials.

In accordance with yet another embodiment of the present invention, there are provided food products comprising the invention defatted meat compositions described herein. For example, as discussed above, the invention defatted meat composition can be used in a variety of food products, such as processed meat, poultry, or fish products (e.g., hot dogs, dry or semi-dry sausages), health foods, snack foods (e.g., baked high protein-type snack products), protein drinks, and the like. The invention food products are prepared by methods well-known in the art (see, e.g., U.S. Pat. Nos. 4,844,922; 4,876,103; 4,504,515; and the like).

It is important to design a product formula, e.g., bologna, so that protein to water ratio is sufficiently optimized to give desirable yield and/or texture, as well as other required characteristics of finished product. It is possible to replace either part or all of very expensive lean meats in the product formula with the low cost, low fat, invention defatted meat, and still produce a composition having good meat functionality.

For example, in one embodiment, an invention bologna food product containing less than 0.5% fat was compared with a conventional low fat (3% fat) bologna with respect to texture, taste, flavor and other organoleptic properties. The invention bologna containing the defatted meat composition produced herein, was similar in all aspects to a conventional low-fat-containing bologna product.

Each of the U.S. patents referenced herein are hereby expressly incorporated by reference.

OPERATION

Raw meat starting material, after being mixed to a uniform fat content and temperature, is pumped continuously through a heat exchange device (e.g., a scraped surface heat exchanger) so that the temperature of meat is brought to the normal body temperature of the corresponding animal species from which the raw meat starting material is derived. The system is maintained in such a way that no portion of raw material reaches a temperature where protein denaturation occurs.

Figure 1:
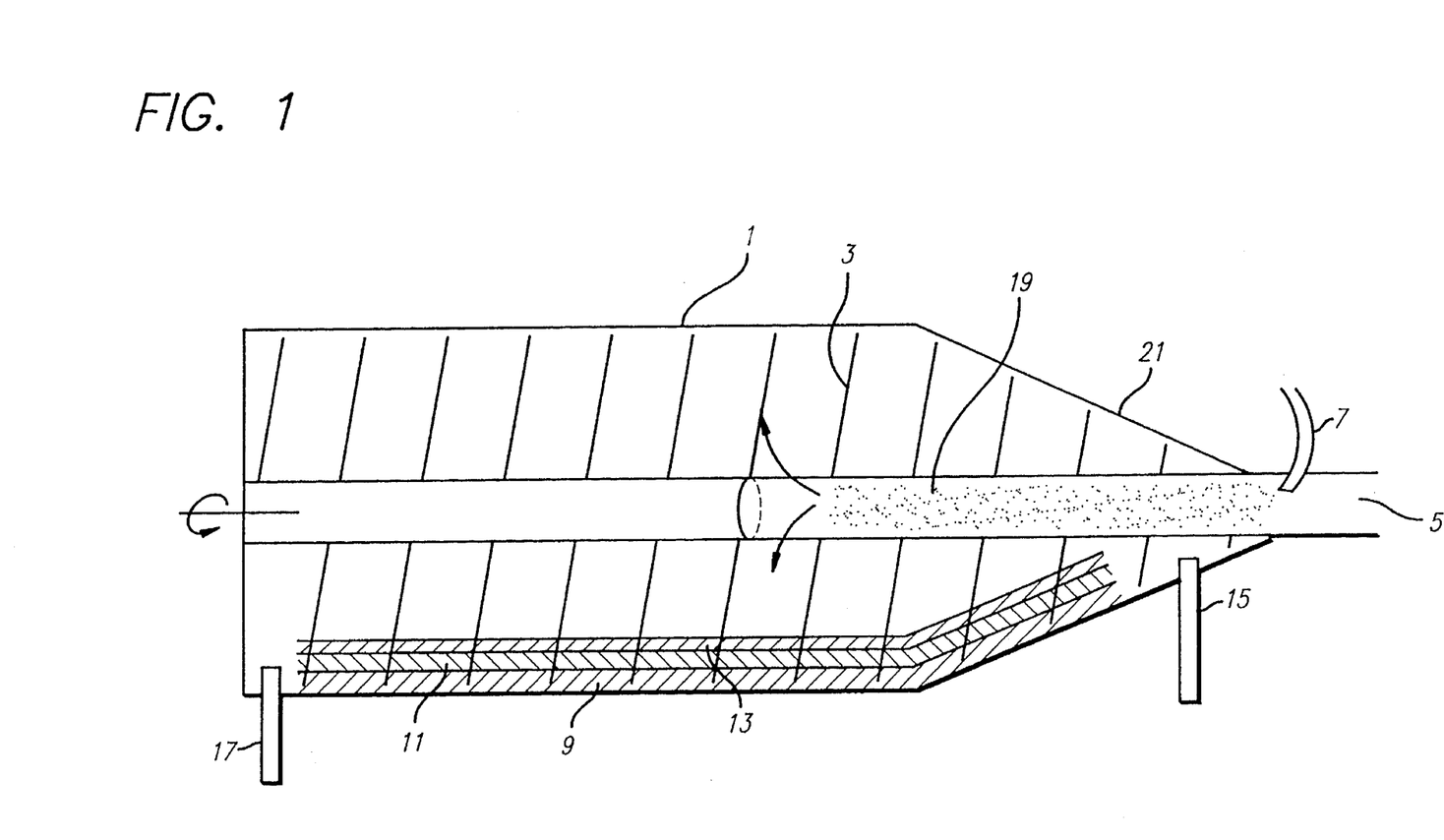
FIG. 1 shows an aspect of the invention method where hydrostatic pressure, applied through a water inlet 7, is employed to separate the meat layer 9 from the boundary layer 11 and the fat layer 13. The raw meat 19 is introduced into the rotating bowl 1 of the decanter centrifuge through a feed tube 5. For further details of FIG. 1, see the "OPERATION" section of the specification.

After the temperature of the raw meat material has been equilibrated to the respective species body temperature, raw meat material is continuously pumped to a decanter centrifuge through a feed tube 5. In the rotating bowl 1 of the decanter centrifuge, a layer of meat 9 is formed in the solid phase, and two layers are formed in the liquid phase 11 and 13 as shown in FIG. 1.

The meat layer 9 is closest to the rotating bowl 1 of centrifuge. At the top of this three layer system is the distinct fat layer 13 which mostly contains fat droplets and fat particles of adipose tissues, and very small amounts of moisture. A boundary layer 11 is formed sandwiched between layers 9 and 13. This boundary layer 11 (i.e., "intermediate layer") is lighter than the meat layer 9, but is heavier than the distinct fat layer 13.

The boundary layer 11 contains a mixture of unseparated fat droplets, muscle tissues containing phospholipids, fat particles, proteins and fine meat fibers. The "boundary layer" is difficult to separate efficiently because of its close specific gravity with the meat layer 9.

In order to produce a very low fat meat consistently, the boundary layer 11 must be removed on a continuous basis from the meat layer 9. When defatted meat is discharged from the bowl, the boundary layer tends to get mixed in with the meat layer, thereby raising the fat content of the meat.

temperature of live turkey). The temperature adjusted raw material was pumped in a continuous manner to a decanter centrifuge (Alfa Laval, Denmark, Model #NX 309B-31, AVNX 309B-31G, or the BTNX 3500) operating in a range of 2000–4000 g force. In the feed tube of the decanter centrifuge, a sufficient amount of water (0.2 gal/10 lbs. raw material/minute) was metered to create enough hydrostatic depth or pressure in the decanter so that fat, fatty tissues, water and some meat particles are removed from the ingoing material according to Stoke's law. The temperature of the metered water was adjusted to match the temperature of the ingoing raw material.

The absolute water content of decanted defatted meat composition did not increase above the natural moisture already present in raw material. There was no dilution of raw material with respect to water. This shows that fat reduction is achieved purely on the basis of fat removal, rather than on the basis of dilution with water in the resulting fat reduced meat. The fat content of the defatted meat composition prepared as described herein has a range from 0.2 to less than 2% fat as shown in Table 1.

TABLE 1

| Lab # | Product Description | % Prot | % Fat | % MDis | % Ash | % Carbo | Kcal/ 100 g | % Salt | Na+ mg/ 100 g | Pot mg/ 100 g | Ca mg/ 100 g | Iron mg/ 100 g | % Dex | % Suc | % Fruc | Chol mg/ 100 g |
|---|---|---|---|---|---|---|---|---|---|---|---|---|---|---|---|---|
| 14624 | Raw material MDTM | 16.8 | 9.5 | 73.4 | 1.1 | 0.0 | 153 | 0.16 | 76 | 181 | 111 | 1.54 | 0 | 0 | 0 | 83.6 |
| 14625 | 2-A Defatted | 18.6 | 0.8 | 80.3 | 1.1 | 0.0 | 82 | 0.09 | 71 | 157 | 127 | 1.36 | 0 | 0 | 0 | 61.9 |
| 14626 | 3-B Defatted | 19.4 | 1.1 | 79.2 | 1.2 | 0.0 | 88 | 0.09 | 60 | 131 | 214 | 1.29 | 0 | 0 | 0 | 60.5 |

In accordance with the present invention, a solution for removing the boundary layer is provided, thereby producing a very low fat meat. Separation of the boundary layer 11 is achieved by forcing this layer to separate from the meat layer 9. In one aspect of the invention, this is accomplished by introducing, through inlet 7, a small but precisely metered amount of water into the feed tube 5 of centrifuge bowl 1 as close to the point of entry into the centrifuge bowl as possible. This creates a fluid pressure enough to mix the fat and boundary layers 11 and 13 and to facilitate complete removal of fat from meat phase 9.

The layers 11 and 13 are the liquid portion of the raw meat 19 introduced into the decanter. The solid defatted meat layer 9 on the inside wall of the rotating bowl 1 is conveyed out through the solid phase outlet ports 15 in the tapered end 21 of the centrifuge by a rotating screw conveyor 3 inside the decanter. At the tapered end 21 of the decanter (i.e., beach area), the defatted meat layer 9 is separated from the liquid layers 11 and 13 (similar to the effect of sand separating from water on sloped beach) where it is further dried by gravitational forces. The fat and boundary layers 11 and 13 flow backwards toward the wider end of centrifuge due to the pressure difference between inside of centrifuge and the liquid-phase outlet ports 17.

The invention will now be described in greater detail by reference to the following non-limiting examples.

EXAMPLE 1

Two thousand pounds of mechanically deboned turkey meat was produced using a U.S.D.A. approved deboning machine. The temperature of this mechanically deboned turkey meat (MDTM) was adjusted using a scraped surface heat exchanger to about 97°–100° F. (i.e., normal body

EXAMPLE 2

The procedure in Example 1 was used except mechanically deboned turkey (MDT) was used rather than MDTM. The distinction between MDTM and MDT is that MDT can include turkey skin but MDTM does not. The defatted meat composition processed in this manner had a fat content from 0.2 to less than 2%.

EXAMPLE 3

The same manufacturing procedure as described in Examples 1 or 2 was used, except that raw material was pumped directly into the decanter centrifuge without adding metered water into the feed tube of the decanter. Using this process, fat, some moisture, and some raw material was removed from the feed raw material. The fat stream or liquid portion of the decanter was clearer in color than in Examples 1 or 2. The fat content of solid phase meat composition obtained in this manner was between 4 to 12%.

EXAMPLE 4

Two thousand pounds of mechanically deboned turkey drum meat with an initial fat content of and/or mechanically deboned turkey wing meat was used as raw material with a 10% fat content in the process described in Example 1. The resulting (solid phase) defatted meat composition had a fat content of 0.2 to less than 5%.

EXAMPLE 5

Two thousands pounds of ground beef having a fat content of approximately 50% was processed as described in Example 1. The raw material temperature was again adjusted to the live body temperature of cattle (i.e., 97°–100° F.). The fat content of meat isolated in this manner ranges from 2% to 5%.

EXAMPLE 6

The defatted meat separated by process described in Example 1 was collected, chilled immediately by using solid $CO_2$ and analyzed for amino acid profile using the protein hydrolysate method. The amino acid profile is presented in Table 2.

TABLE 2

| % | Sample A<br>Lab #14624<br>Raw<br>Material MDTM | Sample B<br>Lab #14625<br>2-A Defatted | Sample C<br>Lab #14626<br>3-B Defatted |
|---|---|---|---|
| Aspartic Acid | 9.42 | 9.27 | 5.92 |
| Glutamic Acid | 14.73 | 15.12 | 14.91 |
| Hydroxyproline | 1.29 | 1.38 | 1.83 |
| Serin | 3.82 | 3.59 | 3.66 |
| Glycine | 5.37 | 5.38 | 5.73 |
| Histine | 2.86 | 3.64 | 3.86 |
| Arginine | 6.05 | 6.21 | 6.17 |
| Threonine | 4.07 | 4.06 | 3.96 |
| Alanine | 5.82 | 5.74 | 5.77 |
| Proline | 8.63 | 9.87 | 9.48 |
| Tyrosine | 2.96 | 2.87 | 2.79 |
| Valine | 4.95 | 4.84 | 4.63 |
| Methionine | 2.48 | 2.38 | 2.31 |
| Cysteine | 1.00 | 0.95 | 0.88 |
| Isoleucine | 5.45 | 5.43 | 5.28 |
| Leucine | 8.60 | 8.85 | 8.39 |
| Phenytalanine | 4.02 | 3.97 | 3.95 |
| Tryptophan | 1.33 | 1.15 | 1.26 |
| Lysine | 7.13 | 5.60 | 8.22 |
| Total % | 100.0 | 100.0 | 100.0 |

Table 2 indicates that the amino acid content of the invention defatted meat composition is essentially similar to the respective raw meat starting material.

EXAMPLE 7

Defatted meat separated by the process described in Example 1 was analyzed for fat distribution. This data is presented in Table 3.

TABLE 3

| Lab # | Product Description | % Total Saturates | % Monounsat. | % Polyunsat. |
|---|---|---|---|---|
| 14624 | Raw material MDTM | 3.3 | 3.3 | 2.9 |
| 14625 | 2-A Defatted | 0.3 | 0.3 | 0.3 |
| 14626 | 3-B Defatted | 0.4 | 0.4 | 0.4 |

The data from Table 3 indicates that proportional distribution of saturated, mono-unsaturated and poly-unsaturated fats remains substantially the same as the respective untreated raw meat starting material.

EXAMPLE 8

Defatted meat separated by the process described in Example 1 was analyzed for vitamin distribution. This data is presented in Table 4.

TABLE 4

| Lab # | Product Description | Thiamine mg/100 g | Riboflavin mg/100 g | Niacin mg/100 g |
|---|---|---|---|---|
| 14624 | Raw Material MDTM | 0.04 | 0.18 | 4.2 |
| 14625 | 2-A Defatted | 0.04 | 0.16 | 4.1 |
| 14626 | 3-B Defatted | 0.04 | 0.14 | 2.9 |

The data from Table 4 indicates that the vitamin profile remains substantially the same as the respective untreated raw meat starting material.

EXAMPLE 9

The defatted meat composition obtained from the process described in Example 1 was used to make various fat content bologna including fat free bologna. All fat levels, including fat free bologna, had flavor and sensory qualities comparable with typical low fat bologna. In addition, the invention bologna food product containing 0.5% fat content, which was produced by methods well-known in the art, was analyzed for myoglobin content and compared to 3 non-invention bologna products. The results are provided in Table 5.

TABLE 5

| Sample | % Myoglobin | mg/g Myoglobin |
|---|---|---|
| A. Lab #14094 Healthy Choice Bologna (Control A) | 0.011 | 0.11 |
| B. Lab #14095 Healthy Choice Bologna/Defatted (B) | 0.021 | 0.21 |
| C. Lab #14096 Healthy Choice Bologna/Defatted (C) | 0.017 | 0.17 |
| D. Lab #14097 0.5% Fat (D) | 0.024 | 0.24 |

The results indicate that the invention bologna prepared using the invention defatted meat composition has at least as much myoglobin content as commercially available bologna products.

EXAMPLE 10

The defatted meat composition obtained from the process described in Example 1 was used to formulate and process low fat meat products such as hot dogs, smoked sausages, and other products having low fat/low cholesterol requirements. The resulting food products each had the desired low-fat content, flavor, and texture.

While the invention has been described in detail with reference to certain preferred embodiments thereof, it will be understood that modifications and variations are within the spirit and scope of that which is described and claimed.

That which is claimed is:

1. A method for defatting meat comprising:

pumping raw meat starting material through a heating means to adjust the temperature of said raw material up to about the live body temperature of the corresponding species, then feeding said raw material into a decanter centrifuge maintained under suitable conditions to form a substantially solid layer of defatted meat, an intermediate boundary layer containing particles of fat, meat and moisture, and a substantially liquid layer of fat within the centrifuge by centrifugal separation, and metering liquid into the temperature adjusted raw material entering the centrifuge in an amount sufficient to separate the meat layer from the intermediate boundary layer and the fat layer during centrifugal separation in the centrifuge, then driving the boundary layer from the centrifuge along with the substantially liquid fat layer, and then recovering a defatted meat composition having a moisture content substantially the same as the natural moisture content of the raw meat starting material from the centrifuge.

2. The method according to claim 1, wherein the defatted meat has less than about 2% fat.

3. The method according to claim 1, wherein the defatted meat has a protein profile substantially equivalent to the protein profile of the respective raw meat starting material.

4. The method according to claim 1, wherein the defatted meat is substantially free of denatured protein.

5. The method according to claim 1, wherein the defatted meat has a proportional fat composition substantially equivalent to the fat composition of the respective raw meat starting material.

6. The method according to claim 1, wherein said raw meat starting material is deboned.

7. The method according to claim 1, wherein said raw meat starting material is fragmented.

8. The method according to claim 1, wherein said raw meat material is pumped continuously through said heating means.

9. The method according to claim 1, wherein said raw meat material is pumped through said heating means in the substantial absence of added water.

10. The method according to claim 1, wherein said heating means is a scraped surface heat exchanger.

11. The method according to claim 1, wherein said liquid metered into the temperature adjusted raw material is water.

12. The method according to claim 11, wherein said water is metered through the feed tube of said centrifuge.

13. The method according to claim 11, wherein said water is metered into the temperature adjusted raw material at a ratio in the range of about 0.05 up to about 0.5 gallons water/10 pounds incoming raw material.

14. The method according to claim 11, wherein said water is metered into the temperature adjusted raw material at a ratio of about 0.2 gallons water/10 pounds incoming raw material.

15. The method according to claim 1, wherein the defatted meat has less than about 10% fat.

16. The method according to claim 1, wherein the defatted meat has less than about 5% fat.

17. The method according to claim 1, wherein the defatted meat has less than about 1% fat.

18. A method for producing defatted meat from a fragmented raw meat starting material using a decanter centrifuge having a feed tube for discharging the fragmented raw meat starting material into a rotating bowl for separating the starting material into separate layers by centrifugal separation, comprising the steps of:

pumping a fragmented raw meat starting material through a heating device to adjust the temperature of the raw material up to about the live body temperature of the corresponding species;

introducing the temperature adjusted starting material into a feed tube of a decanter centrifuge;

metering liquid into the feed tube along with the temperature adjusted starting material;

discharging the contents of the feed tube into a rotating bowl of the decanter centrifuge to form a substantially solid layer of defatted meat and a substantially liquid layer of fat and; then driving the defatted meat layer from the centrifuge in the substantial absence of the fat layer, the defatted meat layer having a moisture content substantially the same as the natural moisture content of the raw meat starting material.

* * * * *